N. KRELL.
GUARD FOR AUTOMOBILE WHEELS.
APPLICATION FILED DEC. 29, 1910.
1,007,878.
Patented Nov. 7, 1911.
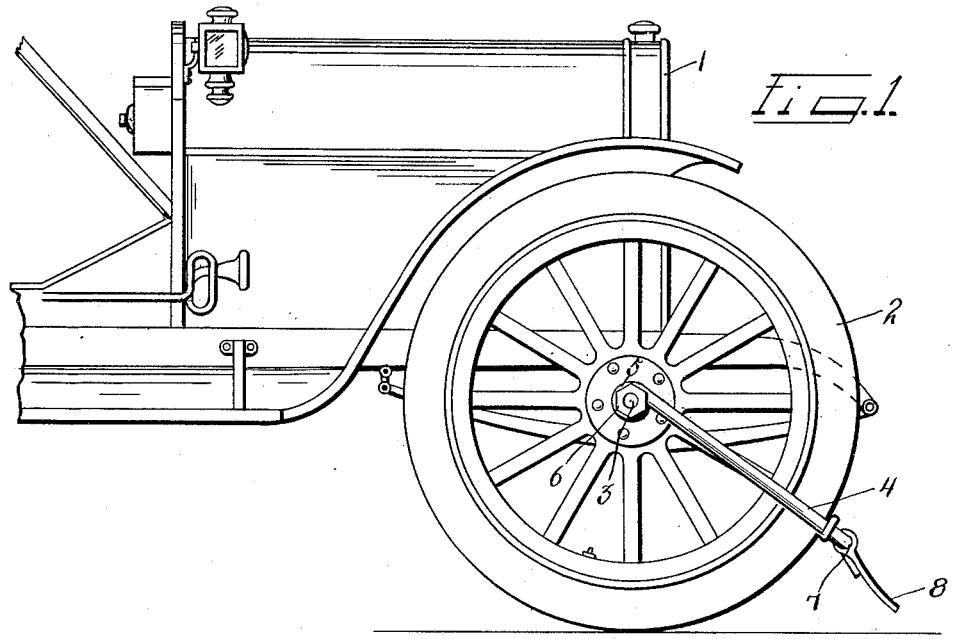
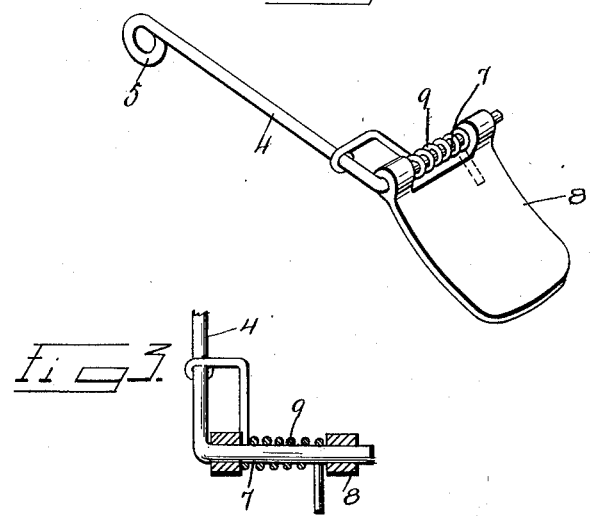
Inventor
N. KRELL.

UNITED STATES PATENT OFFICE.

NICHOLAS KRELL, OF BARTON, WISCONSIN.

GUARD FOR AUTOMOBILE-WHEELS.

1,007,878.  Specification of Letters Patent.  Patented Nov. 7, 1911.

Application filed December 29, 1910. Serial No. 599,854.

*To all whom it may concern:*

Be it known that I, NICHOLAS KRELL, a citizen of the United States, residing at Barton, in the county of Washington, State of Wisconsin, have invented certain new and useful Improvements in Guards for Automobile-Wheels; and I do hereby declare the following to be a full, clear, and exact description of the invention, such as will enable others skilled in the art to which it appertains to make and use the same.

This invention relates to guards for automobile wheels, and more particularly to those which can be conveniently attached to those of the usual construction.

The primary object of the invention is to provide a simple, practical and efficient device of the character described which is adapted to automatically protect the wheels and particularly the tire thereof from stones or other obstructions, thus preventing the said tires from being punctured or otherwise injured.

Another object of the invention is in the provision of a yieldingly curved projecting guard which is positioned and supported in advance of the tread portion of the wheels of the machine, whereby when the guard meets with or strikes an obstruction that cannot be ordinarily displaced or moved out of the path of the machine, the said guard will yield rearwardly sufficiently and toward the tire of the wheel to pass over the stone or other obstruction, the construction of the device being such as to automatically assume its normal position after the said obstruction has been passed.

Briefly stated the invention consists of an arm of sufficient length and capable of being adjustably secured to the projecting end of the axles of the machine, said arm extending forwardly in advance of the wheels, a right angular extension forming a rigid part of the lower end of the arm the length of which is approximately the width of the tire of the wheel, a curved protecting guard plate hingedly attached to said right angular extension, and a spring properly arranged about the movably connected portions of the device for yieldingly holding the guard plate in an operative position and at the proper distance from the ground for all practical purposes.

With the above and other objects in view the invention consists in certain novel details of construction as will be hereinafter described in the specification, illustrated in the accompanying drawings and pointed out in the appended claim.

In the drawings:—Figure 1 is a side elevation of the forward end of an ordinary automobile showing the invention attached thereto. Fig. 2 is a perspective view of the complete invention detached from the machine. Fig. 3 is a transverse section of the hinged portion of the device.

Referring to the drawings 1 represents an ordinary automobile body, 2 the wheels thereof, 3 the axle of the machine all of which are of the well known construction and to the axle of which the invention can be readily and conveniently attached.

The invention consists particularly of a rigid arm 4 having an eye 5 of a size to freely pass over the outer projecting end of the axle 3, the usual nut 6 which is screwed upon the said projecting end of the axle rigidly holding the said arm in an adjusted position in respect to the wheel of the machine, it being understood that the arm thus arranged will be positioned on the outside of the wheel. The opposite or lower end of the arm 4 is provided with a right angular extension 7 of sufficient length and is projected inwardly over the tread of the wheel and slightly in advance of the same. Hingedly attached to the right angular extension 7 of the arm 4 is a curved guard plate 8 the width of which is slightly greater than the width of the tire of the wheel of the machine, whereby the said tire is properly protected from stones or other obstructions when said guard is in its normal position and properly positioned at a suitable distance from the ground. Encircling the right angular extension 7 of the arm 4 is a coiled spring 9 one end of which bears against said arm and the opposite arm in contact with and bearing against the under surface of the guard plate 8 adjacent to its hingedly connected portion, whereby said guard plate is yieldingly held at a proper position above the ground and in advance of the tire or tread portion of the wheel of the machine. Thus it will be seen that the tire of the wheel is thoroughly and properly protected from stones or other obstructions that are liable to puncture or otherwise disable the tire, and should the said guard encounter or come in contact with an obstruction that cannot be ordinarily removed or displaced from the path of the machine, the said guard will be deflected inwardly or toward the tire by impact with the said obstruction whereby the said guard plate will not be injured, the latter resuming its original or normal position after the obstruction has been passed.

It is to be observed that the guard should be properly adjusted in respect to the ground in order that the lower free end of the guard plate will readily pass over the ordinary irregularities of a road-bed, and that the coiled spring 9 should be of sufficient strength to hold the guard plate in its normal and operative position under ordinary conditions.

What is claimed is:—

A guard for automobile wheels comprising an arm having an eye for adjustment to the axle of the machine, a right angular extension forming the lower end of said arm and projected inwardly, a guard plate hingedly attached to the right angular extension of said arm and extended across and in advance of the tire of the wheel of the machine, and a coiled spring encircling said extension one arm of which bears against the arm of the guard thus constructed and having its opposite arm bearing against the under curved surface of the guard plate, whereby the latter is yieldingly held in a position to be moved toward the tire of the wheel of the machine.

In testimony whereof, I affix my signature, in presence of two witnesses.

NICHOLAS KRELL.

Witnesses:
FRANK POMAHAL,
GUSTA DEGNITZ, Sr.

---

Copies of this patent may be obtained for five cents each, by addressing the "Commissioner of Patents, Washington, D. C."